April 11, 1967     J. C. VOGELI, SR     3,313,053

REGISTRATION CARD HOLDER

Filed Dec. 2, 1964

INVENTOR.
JAMES C. VOGELI, SR.

BY *Kimmel, Crowell & Weaver*
ATTORNEYS.

United States Patent Office 3,313,053
Patented Apr. 11, 1967

3,313,053
REGISTRATION CARD HOLDER
James C. Vogeli, Sr., 6413 Clara Way,
North Highlands, Calif. 95660
Filed Dec. 2, 1964, Ser. No. 415,282
2 Claims. (Cl. 40—10)

This invention relates to a registration card holder for automobiles and the like, and constitutes an improvement over my previous application Serial No. 391,949, filed August 25, 1964,, entitled "Registration Card Holder."

A primary object of this invention is the provision of improved means for holding the registration card of a motor vehicle in a position to be readily visible through the windshield of a motor vehicle from the exterior thereof.

A further object is the provision of an improved and simplified means for attaching the holder in an appropriate position on the vehicle.

An additional object of the invention is the provision of a device of this character which may be readily positioned in such a location as not to interfere with the vision of the driver of the vehicle.

A still further object of the invention is the provision of a device of this character wherein a portion of the holder is removable, so that the registration may be shown, when required, without the necessity of removing the card from the holder per se.

A still further object of the invention is the provision of a device of this character which is sturdy and durable in construction, simple and inexpensive to manufacture, and which may be attached to or detached from the vehicle with a minimum of effort and difficulty.

Still other objects will in part be obvious and in part be pointed out hereinafter and shown in the accompanying drawing wherein.

Similar reference characters refer to similar parts throughout the several views of the drawing.

Figure 2:
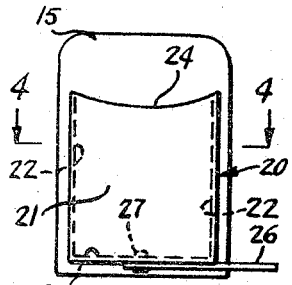
FIGURE 2 is a rear elevational view of the structure in detached relation.
Figure 3:
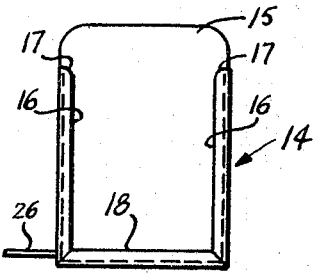
FIGURE 3 is a front elevation thereof.
Figure 1:
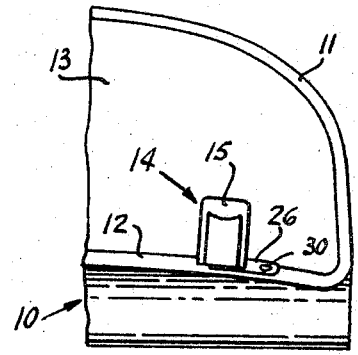
FIGURE 1 is a rear elevational view of one form of registration card holder constructed in accordance with the instant invention shown as attached to the windshield frame of a motor vehicle.
Figure 4:
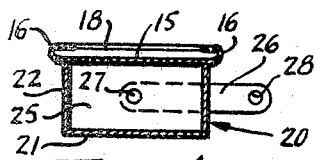
FIGURE 4 is a sectional view taken substantially along the line 4—4 of FIGURE 2, as viewed in the direction indicated by the arrows.

Having reference now to the drawing in detail and more particularly to the species of the invention shown in FIGURES 1 to 4, there is generally indicated at 10 in FIGURE 1 a fragment of a dashboard of a motor vehicle upon which is mounted a windshield frame 11 having a bottom horizontal member 12 in the usual windshield glass 13. One form of holder according to the instant invention is generally indicated at 14, and is comprised essentially of a plate 15, which may be formed of metal, plastic, or other suitable rigid material, the side portions of which are reverted as at 16 to form side flanges, the tops of which are cut away as at 17, and the bottom of which is similarly reverted to form a bottom flange 18. The plate is preferably of the size of a conventional registration card so that the flanges aforementioned form a pocket therefor, through which the face of the registration card is exposed. In this form of the invention a rectangular metal box 20 including a rear wall 21 and side walls 22 is securely affixed, as by brazing or the like, to the rear of the plate 15, and forms a pocket adapted for the reception of a package of cigarettes. The compartment is also obviously provided with a bottom wall 23. The top of rear wall 22 is cut away as at 24 to facilitate access to the package.

A metal or plastic arm 26 is pivoted on a stud 27 to the center portion of bottom wall 25 and extends laterally beyond the edge of the plate. At its outer or free end, the member 26 is provided with an opening 28.

In the use and operation of the device, one of the molding screws 30 is removed from the bottom rim of the windshield, and reinserted through the opening 28 back into its original aperture so that the member 14 is pivotally or swingably mounted on the link or member 26. The arrangement is thus such that the flanges 16 and 18 face the windshield, and when the registration card is positioned in the holder thus formed, it is readily visible through the windshield from the exterior of the vehicle. Similarly, the registration card may be readily removed from the pocket formed by the flanges when required.

Figure 6:
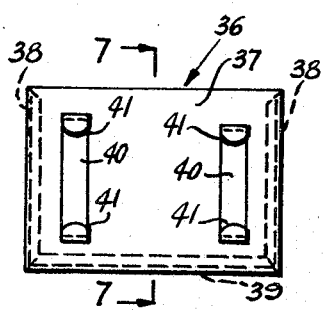
FIGURE 6 is a rear elevational view of the holder of FIGURE 5, on an enlarged scale.
Figure 5:
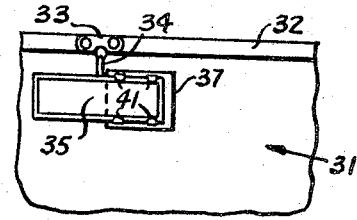
FIGURE 5 is a fragmentary view of the windshield and mirror of a motor vehicle showing a modified form of the invention attached thereto.
Figure 7:
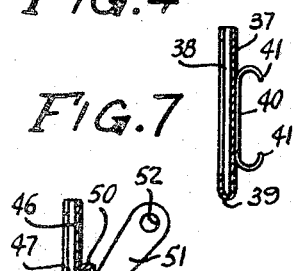
FIGURE 7 is a sectional view taken substantially along the line 7—7 of FIGURE 6 as viewed in the direction indicated by the arrows.

FIGURES 5, 6 and 7 disclose a modified form of the invention wherein in FIGURE 5 there is generally indicated the windshield of the vehicle at 31, having a top frame 32 upon which is mounted a mirror bracket 33 having a suspending leg 34 which supports the mirror 35. The registration card of the instant invention is generally indicated at 36 and comprises a plate 37, which is formed with reverted side edges 38 and a reverted bottom edge 39 forming a pocket for the registration card. Upon the rear of plate 37 are positioned two spring clips 40, each of which has its ends reverted toward each other as at 41, to provide lugs. The arrangement is such that the device is adapted to be mounted over one end of the mirror 35 with the lugs 41 engaging over the top and bottom edges thereof for the plate 37 facing outwardly, so that the registration card is also visible from the back of the mirror.

Figure 10:
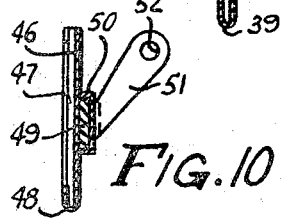
FIGURE 10 is a sectional view taken substantially along the line 10—10 of FIGURE 9, as viewed in the direction indicated by the arrows.
Figure 9:
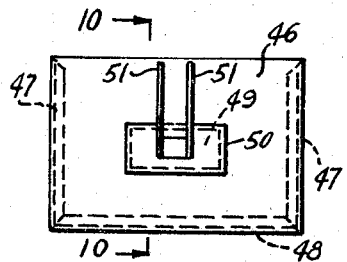
FIGURE 9 is an enlarged rear elevational view of the form of the invention shown in FIGURE 8.
Figure 8:
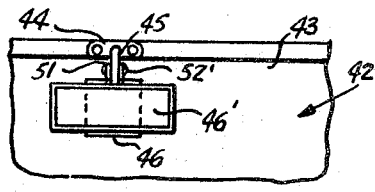
FIGURE 8 is a view similar to FIGURE 5 but showing a modified form of the registration holder of the instant invention attached to the mirror bracket.

FIGS. 8, 9 and 10 disclose a further modified form of the invention and in FIGURE 8 a fragment of a windshield is generally indicated at 42 and includes a top frame member 43 upon which is mounted a mirror bracket 44 having an extending arm 45 which supports the mirror 46, all in conventional manner.

In this form of the invention there is provided a plate 46 having reverted side edges 47 and a reverted bottom edge 48 defining a card-receiving pocket, the plate being adapted to be engaged by a magnet 49. The magnet is contained in the metallic shelf 50 from the rear of which extend a pair of upwardly extending arms 51 provided with apertures 52. The arms 51 extend in parallelism, and are arranged to be mounted on the leg of the mirror bracket by removal of the conventional screw 52, which normally holds the telescoping sections of such a rod in assembled relation, and reinserting the same through the openings 52 and into its original aperture in the rod 45. In this form of the invention it will also be seen that the registration card contained in the holder on the back of the mirror is visible through the windshield.

Figure 11:
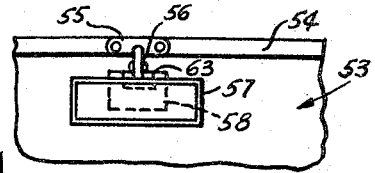
FIGURE 11 is a view similar to FIGURE 8 but showing a still further modified form of the instant invention.
Figure 13:
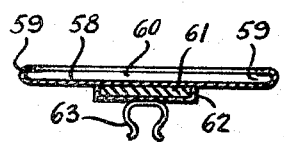
FIGURE 13 is a sectional view taken substantially along the line 13—13 of FIGURE 12 as viewed in the direction indicated by the arrows.
Figure 12:
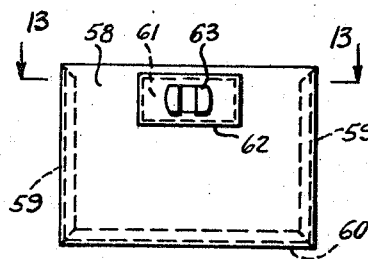
FIGURE 12 is a rear elevational view of the form of the invention shown in FIGURE 11.

FIGURES 11, 12 and 13 disclose a still further modified form of the invention. FIGURE 11 is similar to FIGURE 8 and discloses a fragment of a windshield generally indicated at 53 having a top frame 54, a mirror bracket 55 and having a leg 56 thereon which supports a rear view mirror 57. The card holder of this form of the invention comprises a metal plate 58 having reverted side edges 59 and a reverted bottom edge 60 defining a pocket. The plate is adapted to be held by means of a magnet 61 contained in a casing 62, upon the rear face of which is a U-shaped spring clip 63. In this form of the invention the clip 63 is adapted to encircle the mirror mounting rod 56 to hold this form of card holder in position on the back of the mirror, so that here too the registration card is visible through the windshield of the vehicle.

From the foregoing it will now be seen that there is herein provided an improved registration card holder particularly adapted for motor vehicles, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:
1. A registration card holder for a vehicle, adapted to be visible through the windshield thereof, comprising a generally rectangular flat plate having its side and bottom edges reverted to form a card receiving pocket and means on the side of the plate opposite said pocket for detachably securing the same to the interior of a vehicle in a position to be visible through the windshield, said plate being metallic and said means for securing the holder to the vehicle comprising a magnet engageable with the rear of the plate and supporting means for said magnet, said magnet supporting means comprising a receptacle surrounding said magnet and a pair of flat apertured arms extending therefrom, the apertures being adapted to be engaged by a screw carried by a vehicle mirror support.

2. A registration card holder for a vehicle, adapted to be visible through the windshield thereof, comprising a generally rectangular flat plate having its side and bottom edges reverted to form a card receiving pocket and means on the side of the plate opposite said pocket for detachably securing the same to the interior of a vehicle in a position to be visible through the windshield, said plate being metallic and said means for securing the holder to the vehicle comprising a magnet engageable with the rear of the plate and supporting means for said magnet, said magnet supporting means comprising a receptacle surrounding said magnet and a spring clip secured to said receptacle adapted to encircle the mounting arm of a vehicle miror.

References Cited by the Examiner

UNITED STATES PATENTS

| 1,532,590 | 4/1925 | Kittelson | 40—129 X |
| 2,097,419 | 10/1937 | Schmidt | 40—10 X |
| 2,494,179 | 1/1950 | King | 40—129 |
| 2,620,579 | 1/1952 | Dienes | 40—129 |
| 3,206,883 | 9/1965 | Crawford | 40—10 X |
| 3,213,556 | 10/1965 | Cobbs | 40—10 |

FOREIGN PATENTS 368,831   3/1939   Italy.

EUGENE R. CAPOZIO, *Primary Examiner.*

W. J. CONTRERAS, *Assistant Examiner.*